United States Patent

[11] 3,549,921

[72] Inventors Clifford Halstead;
Jonathan Reed, Cambridge, England
[21] Appl. No. 845,225
[22] Filed July 28, 1969
[45] Patented Dec. 22, 1970
[73] Assignee Pye Limited
Cambridge, England
a British Company
[32] Priority Aug. 15, 1968
[33] Great Britain
[31] No. 39154/68

[54] MAGNETIC INDUCTION COUPLINGS
15 Claims, 7 Drawing Figs.
[52] U.S. Cl.................................................. 310/105,
310/98
[51] Int. Cl.............................................. H02k 49/02
[50] Field of Search.......................................... 310/98,
105, 92—107(Cursory)

[56] References Cited
UNITED STATES PATENTS
3,209,184  9/1965  Woodward, Jr. ............ 310/103

Primary Examiner— D. X. Sliney
Attorney—Holcombe, Wetherill & Brisebois

ABSTRACT: This invention relates to a magnetic induction coupling having two rotatable parts and a stator part arranged in axially spaced relationship. One of the rotatable parts comprises a disc of nonmagnetic material which is arranged between the other rotatable part carrying axial extending pole pieces and a portion of the stator. The stator has a region extending around the periphery of the poled rotatable part to define a radial air gap therebetween and means are associated with the stator for producing a magnetic field which imparts the same polarity to all the pole pieces.

PATENTED DEC 22 1970

MAGNETIC INDUCTION COUPLINGS

The present invention relates to magnetic induction couplings particularly for transmitting torque from a driving shaft to a driven shaft.

The invention consists in a magnetic induction coupling comprising a first rotatable part of ferromagnetic material carrying a plurality of axially extending pole pieces, a second rotatable part comprising a disc of nonferromagnetic material disposed opposite and axially spaced from said pole pieces, and a stator of magnetic material having a portion disposed on the opposite side of said disc from said pole pieces, and including a region extending around the periphery of said first rotatable part to define a radially extending air gap therebetween, and means associated with said stator for producing a magnetic field which passes from said pole pieces through said disc and said stator and back through the radially extending air gap, and thereby imparts the same polarity to all of said pole pieces.

The invention will be described, by way of example, with reference to the accompanying drawings, in which.

Figure 5A:
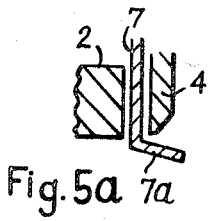
Figure 5B:
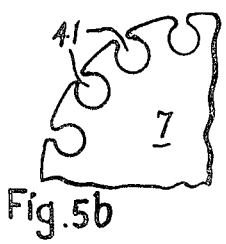
Figure 5C:
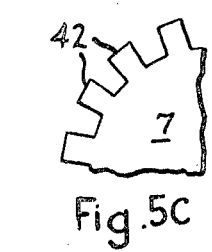

FIG. 5a, 5b, and 5c are scrap view of modifications to the disc.

Figure 1:
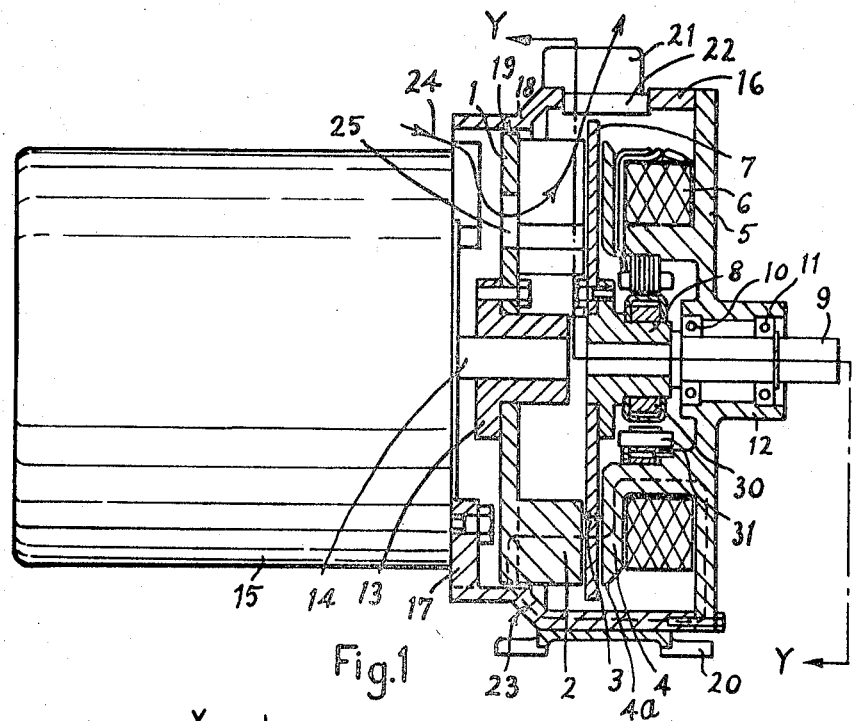
FIG. 1 is a sectional side view of one embodiment of induction coupling along line X-X in FIG. 2.
Figure 2:
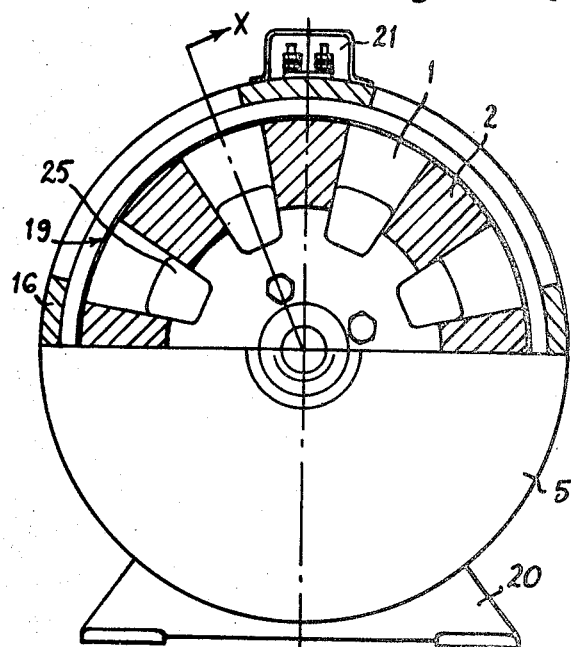
FIG. 2 is a half-sectioned end view of the embodiment of FIG. 1 along line Y-Y in FIG. 1.

Referring to FIGS. 1 and 2, the induction coupling shown comprises a rotor 1 of ferromagnetic material having axially projecting pole pieces 2 which face an axial airgap 3. The other side of the airgap is defined by the face 4 of a stator 5 of ferromagnetic material on which is mounted an energizing coil 6. The coil may be made from copper or aluminum wire or foil. The outer edge 4a of the face 4 is preferably tapered in order to minimize flux leakage. A disc of nonmagnetic material 7 is free to revolve in the airgap 3. This disc 7 is mounted on a hub 8 which is carried by a shaft 9 supported in bearings 10 and 11, which are themselves mounted in an extension 12 of the stator 5. The rotor 1 is mounted on a hub 13 which is carried by the shaft 14. In this embodiment the shaft 14 is shown as constituting the drive shaft of a prime mover 15, e.g. an induction motor. The part of the stator which forms the casing 16 of the coupling has inwardly facing radial projections 17 which serve to locate the motor 15 axially and radially with respect to the stator. The casing 16, of ferrous material, forms a flux return path of which a section 18 defines the outer periphery of a radial airgap 19 between this section and the periphery of the rotor 1. Casing 16 also carries a mounting foot or feet 20 and a terminal box 21 and is provided with ventilation slots 22.

The flux path is shown as interrupted line 23 and passes from the rotor 1, through the pole pieces 2 across the axial airgap 3 containing the disc 7, into stator face 4, through stator 5 around coil 6 and into casing 16, to the section 18 18 and across the radial airgap 19 back into the rotor 1.

The coupling is cooled by air which flows along the path shown by the solid arrowed line 24. Air enters around the casing of motor 15 between the projections 17, and is drawn through holes 25 in the rotor 1. The rotor poles 2 act as a fan to propel air across the face of the disc 7 to cool it. The air flows out through ventilation slots 22. The narrowness of airgap 19 prevents hot air recirculating and mixing with incoming cold air. If desired a concentric shroud may be arranged around and spaced from the casing of motor 15 whereby air is drawn by the rotor through the annular space thus formed and so cools the motor before entering the coupling.

The coupling may be provided with an internally mounted tachometric device comprising a rotatable armature 30 carried by the hub 8, and a stator 31.

The rotor 1 is shown as constructed from a single piece incorporating the pole pieces 2. However, the rotor may also be constructed in any of the following alternative ways.

i. By using a disc of ferrous material exactly as in FIG. 1 except that the poles are separate blocks of ferrous material attached to the rotor by screws, by welding or by any other suitable method.

ii. The rotor 1 may be a narrow ring whose outer diameter defines airgap 19 and whose inner diameter is merely sufficient for satisfactory attachment of the poles and for passing flux into the poles. In this case the hub 13 is substantially as shown but has a greater outside diameter.

iii. The rotor described in (ii) may be homogenous with its poles either by casting or machining from a solid piece of material.

The rotor pole pieces 2 are shown as parallel in an axial direction and radially tapered. However, other forms of pole may be used with any desired shape. The pole pieces may be joined at the inner and/or outer diameter as well as, or instead of, at their rear face.

The rotor pole pieces are shown as eight in number but it will be understood that there may be any number from one upwards as is found most suitable for promoting airflow and producing the required performance from the disc.

The disc 7 is made of nonmagnetic material and the material and size may be those most suitable for the required performance of the induction coupling. By selecting a suitable material, the characteristic of torque with respect to speed can be adjusted to give the required conditions. These may vary between an approximately constant horsepower (torque inversely proportional to speed) and a fan law (torque proportional to secone power of speed). Furthermore, by adjusting the thickness and diameter of the disc a similar variation can be obtained. The disc may also be laminated from two or more thicknesses of similar or dissimilar material (see FIG. 4).

Figure 3:
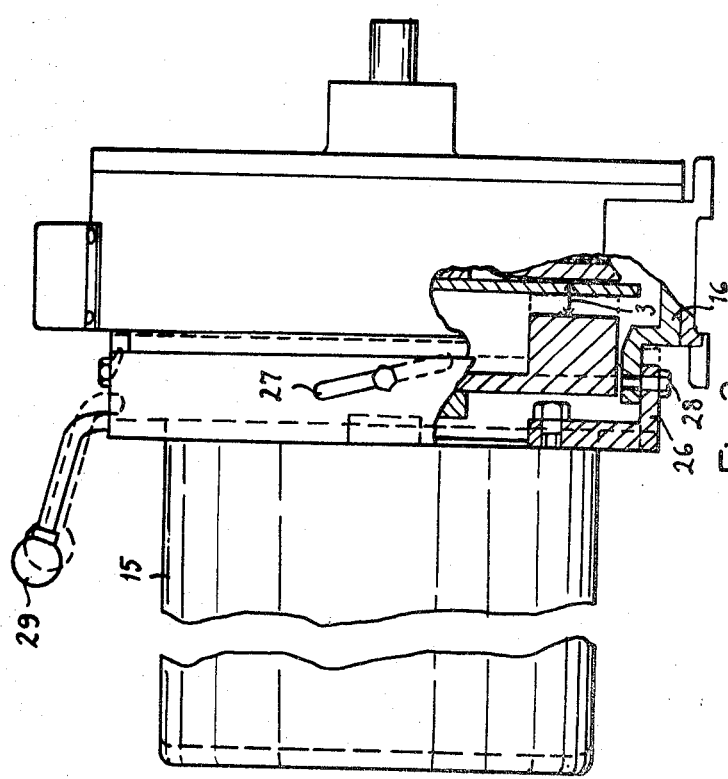
FIG. 3 is a part-sectioned side view of an embodiment having an axially movable rotor.

The length of the axial airgap 3 affects the flux density and hence the inductive reactance of disc 7. Altering the length of airgap 3 will thus cause a change in the torque/speed characteristic since the reactance X is changed in the equation $$T = \frac{ksR}{R^2 + (SX)^2}$$

where T is torque, $s$ is the slip per unit and R is the resistance of the disc. Referring to FIG. 3, an embodiment of induction coupling is shown which enables the rotor to be moved axially while the unit is in operation, thereby varying the length of the airgap 3. It will be understood that this FIG. merely illustrates the principle of axial movement of the rotor and that the method shown is but one of many ways of achieving the desired result. In the embodiment of FIG. 3, the motor 15 is mounted on a member 26 which surrounds the end of the casing 16 and has a number of angled slots 27 through which pass screws 28 fixed into the casing 16, in order to guide member 26. The rotor 1, motor 15 and member 26 are rigidly fixed together so that circumferential movement of handle 29 causes the motor assembly to move axially. The assembly is shown in full lines with the widest airgap 3 and the dotted line position shows the narrowest airgap. The axial movement will cause a change in characteristic such that, for a given load, speed will change. Hence a simple, cheap, manual speed control can be achieved for many forms of driven machine where the torque is fairly constant. The ratio of output speeds will depend on the variation of the airgap 3 and on the level of torque demand in relation to the drive unit. The ratio of maximum to minimum output speed can under suitable conditions be as much as 100 : 1. The arrangement described can obviate the need for a variable voltage supply to the energizing coil of the coupling and the necessity of fitting and sensing a tachometric device and sensing equipment to monitor speed.

Figure 4:
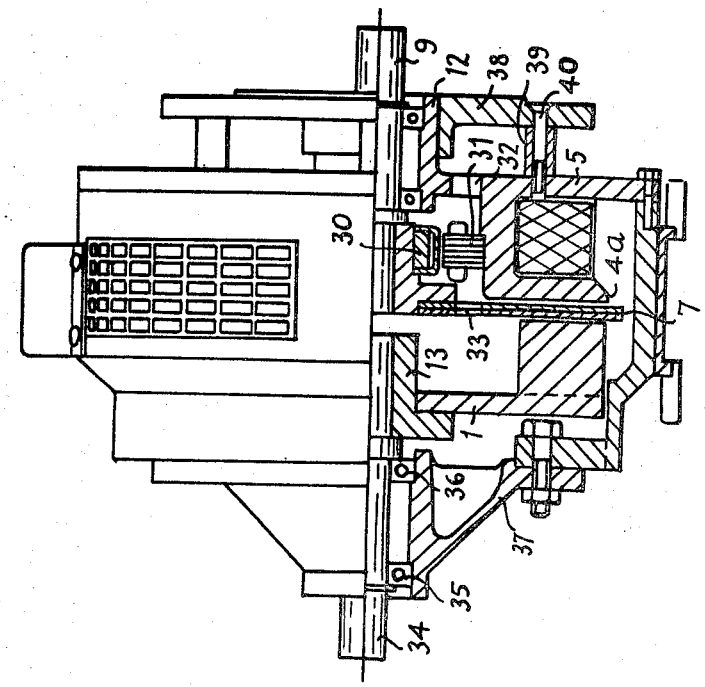
FIG. 4 is a part-sectional side view showing various modifications.

FIG. 4 shows a further embodiment of induction coupling and illustrates various features which may be incorporated in the device. These are:

a. Air holes 32 cut in stator 5 to promote airflow around the coil housing.

b. Air holes 33 cut in disc 7 to promote airflow.

c. The disc 7 formed as a laminated member consisting of two or more pieces of metal. The elements of the disc may be fixed together by any suitable means such as brazing, rivetting, screwing, clamping, electrodeposition or any other suitable method.

d. The hub 13 of rotor 1 is carried by a shaft 34 supported in bearings 35 and 36 mounted in a housing 37.

e. If the induction coupling requires to be flange mounted (for example, to a gearbox) at the drive end, a flange 38 may be fitted which is held concentric with shaft 9 by the extension 12 of the stator 5 and is held square by bosses 39 and screws 40 which also provide rigidity.

FIGS. 5a, 5b and 5c are scrap views of modified forms for the disc 7. In FIG. 5a this disc is provided with a peripheral lip or flange 7a, which imparts increased mechanical stiffness and inertia to the disc. FIGS. 5b and 5c respectively show different forms of notches 41, or slots 42 formed around the periphery of the disc 7. Such notches or slots may be provided where the disc is employed to form a tachometric device in conjunction with sensing devices positioned adjacent the periphery of the disc. Such sensing devices may be a light source and photoelectric device located on opposite sides of the disc, in the region of the periphery, whereby the output from the photoelectric device varies as a function of the rate of cutting of the light beam by the areas between the slots or notches. Other forms of sensing device may be used to provide a tachometer signal which is a function of the speed of the disc.

Whilst particular embodiments have been described, it will be understood that various modifications may be made. Thus, although the rotor 1 has been shown acting as a fan; if desired a separate fan or fans may be fitted to either the disc 7 or the rotor 1. Moreover, the stator face 4 and energizing coil 6 may be replaced by a permanent magnet or magnets.

It will be appreciated that either of the rotatable members may be the constant speed member and either may be the variable speed, variable torque member. Furthermore the outer diameter of face 4 of the stator 5 may or may not be the same diameter as that of the rotor pole pieces 2.

Instead of the coupling being air-cooled it may be liquid-cooled e.g. by water in which case the bearings and the coil assembly are sealed. Yet again the coupling may be surface cooled by passing an air or liquid stream over the surface of the casing.

We claim:

1. A magnetic induction coupling comprising a first rotatable part of ferromagnetic material carrying a plurality of axially extending pole pieces, a second rotatable part comprising a disc of nonferromagnetic material disposed opposite and axially spaced from said pole pieces, and a stator of magnetic material having a portion disposed on the opposite side of said disc from said pole pieces, and including a region extending around the periphery of said first rotatable part to define a radially extending airgap therebetween, and means associated with said stator for producing a magnetic field which passes from said pole pieces through said disc and said stator and back through the radially extending airgap, and thereby imparts the same polarity to all of said pole pieces.

2. An induction coupling as claimed in claim 1, in which the first rotatable part is constructed as a rotor member having the pole pieces formed integrally therewith.

3. An induction coupling as claimed in claim 1, in which the first rotatable part comprises a rotor member having separate pole pieces attached thereto.

4. An induction coupling as claimed in claim 1, in which the disc of nonferromagnetic material is of laminated construction.

5. An induction coupling as claimed in claim 1, in which the disc of nonferromagnetic material is provided with a lip or flange at its periphery.

6. An induction coupling as claimed in claim 1, in which the periphery of the disc is provided with a series of slots or notches.

7. An induction coupling as claimed in claim 1, in which the stator includes a face opposite said pole pieces, and the region extending around the periphery of the first rotatable part forms part of the casing of the coupling.

8. An induction coupling as claimed in claim 1, in which the means for producing a magnetic field comprises an energizing coil supported by the stator.

9. An induction coupling as claimed in claim 1, in which the means for producing a magnetic field comprises one or more permanent magnets.

10. An induction coupling as claimed in claim 1, in which the rotor poles act as a fan to draw cooling air through the coupling.

11. An induction coupling as claimed in claim 1, in which the disc is provided with holes to allow cooling air to flow therethrough.

12. An induction coupling as claimed in claim 1, including a first shaft carrying the first rotatable part, a second shaft carrying the disc and a separate bearing assembly for each of said first and second rotatable shafts.

13. An induction coupling as claimed in claim 1, in which means are provided for varying the axial spacing between the pole pieces and the portion of said stator opposite said pole pieces.

14. An induction coupling as claimed in claim 1, wherein a tachometric device is included within the casing of the coupling.

15. An induction coupling as claimed in claim 14, wherein a tachometric device is arranged adjacent the periphery of the disc and operates by reasons of variations in the characteristics of the periphery of the disc.